Nov. 27, 1951 — L. B. GREEN — 2,576,296
JOINT CONSTRUCTION FOR PANELS
Filed Sept. 25, 1947 — 2 SHEETS—SHEET 1

INVENTOR.
LEE B. GREEN
BY
Kwis, Hudson, Boughton & Williams
ATTORNEYS

Nov. 27, 1951        L. B. GREEN        2,576,296
JOINT CONSTRUCTION FOR PANELS
Filed Sept. 25, 1947        2 SHEETS—SHEET 2
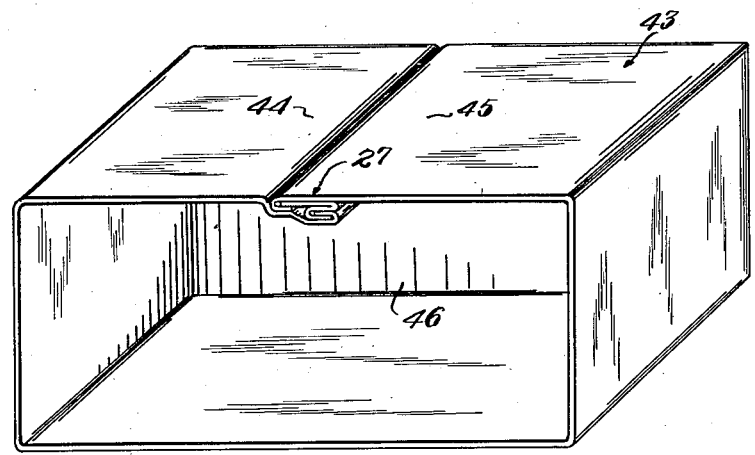
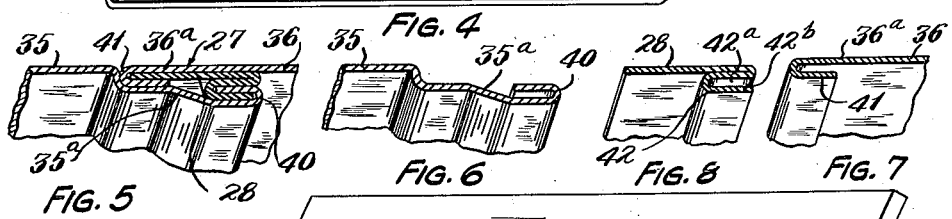
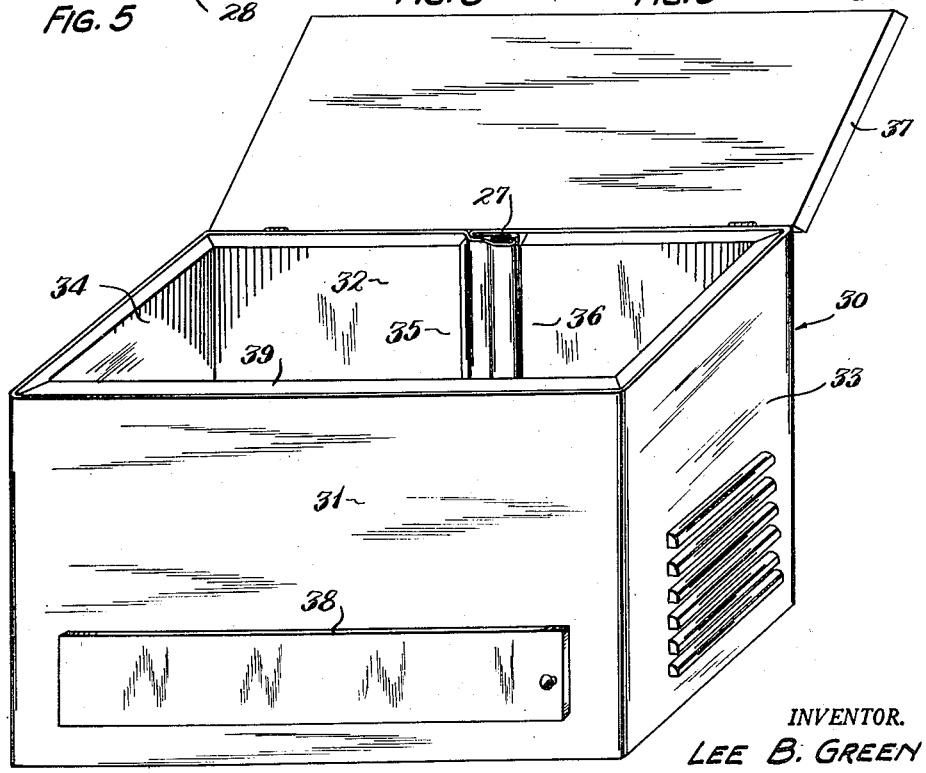
INVENTOR.
LEE B. GREEN
BY
Kwis, Hudson, Boughton & Williams
ATTORNEYS Patented Nov. 27, 1951

2,576,296

UNITED STATES PATENT OFFICE 2,576,296

JOINT CONSTRUCTION FOR PANELS

Lee B. Green, Lakewood, Ohio

Application September 25, 1947, Serial No. 776,040

1 Claim. (Cl. 189—36)

This invention relates to joint constructions for connecting panels, metal sheets, wall members or the like, and as one of its objects aims to provide a novel form of joint for this purpose which can be economically produced, will be very strong and durable, and will result in the connected members being held tightly together with their outer surfaces presenting a desired substantially smooth or flush condition.

Another object of the present invention is to provide an improved joint of the character mentioned in which the adjoining members or portions to be connected have hook elements thereon and are connected by means of a locking strip engaging such hook elements.

A further object of the invention is to provide a joint of the kind mentioned in which the hook elements are carried by overlapping edge portions of the adjoining members and the locking strip lies between the overlapping edge portions.

Still another object of this invention is to provide an improved joint construction of this character in which the locking strip engages in the recesses of the hook elements of the overlapping edge portions and acts to spread the hook elements apart so as to draw the adjoining members together.

Yet another object is to provide an improved joint of the character mentioned in which the adjoining members lie substantially in a common plane and the hook-carrying portion of one of the members is offset inwardly from such common plane to form a shoulder and the hook-carrying portion of the other member overlaps the offset portion and is urged into engagement with the shoulder by the spreading action of the locking strip.

Other objects and advantages of the invention will be apparent from the following detailed description and the accompanying sheets of drawings in which:

Fig. 3 is a perspective view showing the improved joint being used to connect adjacent wall members of a cabinet;

Fig. 4 is another perspective view illustrating the use of the improved joint in the wall of a container;

Fig. 5 is a sectional perspective view illustrating the joint of Figs. 3 and 4 on a larger scale;

Figs. 6 and 7 are perspective sectional views showing the connected members of Fig. 5 in spread-apart relation;

Fig. 8 is a perspective sectional view showing the locking strip of Fig. 5 in detached relation;

Figure 1:
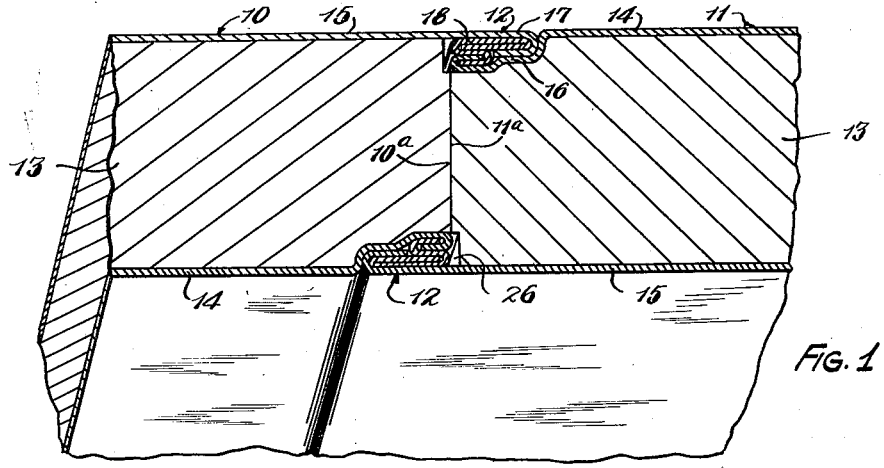
Fig. 1 is a sectional perspective view showing the improved joint being used to connect a pair of panels.

As illustrative of one important use for the improved joint of this invention, Fig. 1 of the drawings shows a pair of panels 10 and 11 having their edges 10a and 11a in substantially meeting relation and connected together by means of the improved joint 12. The panels 10 and 11 may be of the kind used in building construction for forming walls or ceilings and are here shown as disposed substantially in a common plane.

Although the panels 10 and 11 may be of any desired specific construction, they are shown in the drawings as comprising a heat insulating and sound deadening body or slab 13 and surface sheets 14 and 15, preferably of sheet metal, connected to the slab and located on opposite sides thereof. The surface sheets 14 and 15 may extend over the entire area of the two side surfaces of the panel, or they can be strip-like sheets of appropriate width which extend only along the edges of the panel. The body or slab 13 can be of any specific construction suitable for panels of this type and may comprise a slab of bonded fibrous material of the kind used in wall board, or may be a slab of honey-comb cellular paper construction. The surface sheets 14 and 15 can be connected to the slab 13 by the use of suitable fasteners or by means of glue.

When the structure is of substantial thickness, as provided by the panels 10 and 11 shown in Fig. 1, the improved joint 12 is used on both sides thereof and since these two joints are identical in construction it will be necessary to describe only one of them. It will be noted also that the edges of the panels 10 and 11 are of identical construction but are reversed with respect to each other so that the edge of one panel will have a desired cooperating fit with the edge of the adjacent panel.

The joint 12 is formed by the cooperating longitudinal edge portions 16 and 17 of the surface sheets 14 and 15, and a locking strip 18. Fig. 1 of the drawings shows the joint 12 in assembled relation for holding the panels 10 and 11 in connected relation, and Fig. 2 shows the same joint in its disengaged relation with the panels slightly separated and with the locking strip 18 removed, so as to more clearly illustrate the detailed construction of the joint.

Figure 2:
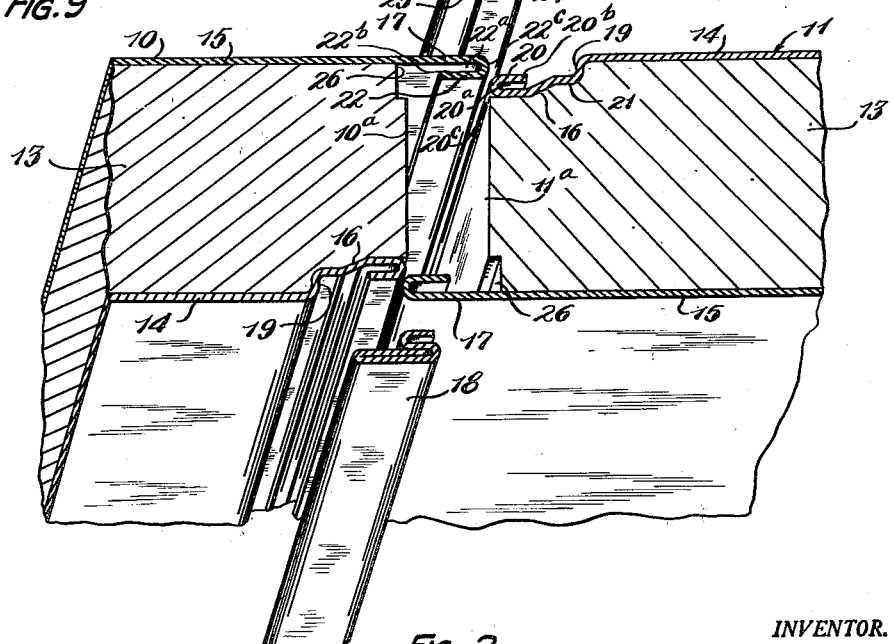
Fig. 2 is a sectional perspective view showing the same panels in adjacent relation but disconnected from each other so as to further illustrate the construction of the joint.

As shown in Fig. 2, the longitudinal edge portion 16 of the sheet 14 is offset inwardly from the plane of the sheet so as to provide a longitudinal shoulder 19 at a point spaced rearwardly or inwardly from the edge of the slab 13 of the panel. The portion 16 is also provided at the free edge thereof with a longitudinal hook element 20. This hook element can be formed by bending the extreme edge portion of the sheet 14 in a reverse direction or doubled relation so as to provide the hook recess 20a and the tongue or flange 20b adjacent thereto. The slab 13 of the panel can be provided with a longitudinal recess or rabbet 21 to accommodate the offset longitudinal edge portion 16. The hook element 20 is preferably located so that the outer end or external bead 20c thereof lies substantially flush with the edge of the slab 13.

The edge portion 17 of the surface sheet 15 projects outwardly in overhanging relation to the edge of the slab 13 and carries a longitudinal hook element 22 which is generally similar to the hook element 20 of the sheet 14. The hook element 22 can be formed by bending the free edge of the portion 17 in a reverse or doubled relation so as to provide the longitudinal hook recess 22a and the longitudinal tongue or flange 22b adjacent thereto. The overhanging edge portion 17 is of a length such that when the panel edges 10a and 11a are brought into substantially meeting or abutting relation, this overhanging portion of one panel will overlap the offset portion 16 of the other panel and the end or external bead 22c of the hook element 22 will substantially engage the longitudinal shoulder 19.

The locking strip 18 is an elongated member made of sheet metal, or the like, and comprising a generally flat strip-like body 24 and a longitudinal hook element 25 carried thereby. The body 24 of the locking strip can be formed by doubling one longitudinal edge portion of a sheet metal blank upon itself, as shown in Fig. 2, and the hook element 25 can be formed by reversely bending the opposite edge portion of the sheet metal blank so that the hook element thus formed extends along and overlies one edge of the flat body 24. The hook element 25, as thus formed, includes a longitudinal hook recess 25a and a longitudinal tongue or flange 25b adjacent thereto. The locking strip 18 thus has the hook element 25 extending along one of its side edges and a flat bead or flange 18a extending along its other side edge.

When the panels 10 and 11 are brought into the substantially meeting relation explained above and shown in Fig. 1, with the edge portion 17 of the sheet 15 overlapping the offset edge portion 16 of sheet 14, it will be observed that the hook elements 20 and 22 then lie between the overlapped portions 16 and 17 and that the recesses 20a and 22a of these hook elements face each other, that is to say, open towards each other. The overlapping portions 16 and 17 and the recesses of the hook elements 20 and 22 now define a space of a shape to snugly accommodate the locking strip 18. To complete the joint 12 the locking strip 18 is inserted endwise into this space so as to assume the position shown in Fig. 1. The insertion of the locking strip can be accomplished either by hand, or by the use of an appropriate tool designed for this purpose.

When the locking strip 18 has been inserted, as mentioned above, the longitudinal edge or flange 18a thereof engages in the recess 22a of the hook element 22 and the hook element 25 of the strip engages the hook element 20 of the sheet 14. In the engagement produced between the hook elements 20 and 25, the flange 20b of the hook element 20 engages in the hook recess 25a of the hook element 25 and the flange 25b of the latter engages in the hook recess 20a. When the locking strip occupies this position it will be seen from Fig. 1 that the strip acts to hold the hook elements 20 and 22 of the sheets 14 and 15 in a spread-apart relation, but since the portions 16 and 17 are in an overlapping relation this spreading-apart of the hook elements 20 and 22 results in the panel edges 10a and 11a being pulled together by the action of the locking strip.

It will also be observed that when the locking strip 18 has been thus inserted it lies between the overlapping sheet portions 16 and 17 and is concealed and confined thereby so that it will form a strong connection between the sheet members 14 and 15 and between the panels 10 and 11, of which these sheet members form a part. It should be observed, also, that when the locking strip 18 has been inserted to complete the joint 12, the external bead 22c of the hook element 22 will be substantially in engagement with the shoulder 19 of the plate 14 and the plate 15, including the overhanging edge portion 17 thereof, will occupy a smooth or flush relationship with respect to the plate 14.

The joint 12 thus formed provides a strong connection between the panels 10 and 11 and entirely eliminates the need for the screws or other fastening members of this kind which have been used heretofore between adjacent panels. It will also be seen that the use of the joint 12 for connecting the panels 10 and 11 results in a wall construction in which the insulating filling or slab 13 of the panels is substantially continuous between adjacent panels and in which all gaps and surface irregularities at the panel joints are eliminated. It should also be explained that if it becomes necessary or desirable to disconnect the panels 10 and 11 from each other, the joints 12 can be readily disengaged by simply withdrawing the locking strips 18 therefrom. As shown in the drawings, the slab 13 can, if desired, be provided with a longitudinal rabbet or recess 26 alongside the overhanging sheet portion 17 to afford clearance for the hook element 20 in assembling the joint 12.

Figs. 3, 4 and 5 of the drawings show how the improved joint can be embodied in metal cabinets, containers, metal furniture and like products of manufacture. The joint 27 of Fig. 5 differs from the joint 12 described above only because the locking strip 28 is of a somewhat different cross-sectional shape. Fig. 3 shows a metal cabinet or chest 30 which can be used in connection with the storing of refrigerated foods, and the like. The cabinet 30 is a box-like structure having upright side and end walls 31, 32, 33 and 34 which are portions of a single metal sheet which is bent to a quadrangular shape so that its ends form adjacent wall portions 35 and 36 at the rear of the cabinet. The cabinet 30 may also include a thermally insulated hinged cover or lid 37 affording access to the storage chamber and a removable panel or cover 38 located in the front wall 31 and affording access to a machine compartment.

The adjacent wall portions 35 and 36 are connected by the joint 27 which extends in vertical relation at a suitable point in the rear wall 32. The side and end walls can be provided adjacent the top thereof with an inwardly extending flange 39, as shown in Fig. 3, and suitable insulating material (not shown) can be installed in the cabinet as a lining lying against or adjacent the inner surfaces of the side and end walls and below the inwardly extending flange 39.

For forming the joint 27, the wall portions 35 and 36 are constructed so as to have overlapping edge portions 35a and 36a which are substantially identical in shape with the overlapping edge portions 16 and 17 of Fig. 1 and which carry hook elements 40 and 41 similar to the hook elements 20 and 22 described above. The locking strip 28 comprises a flat metal strip of single thickness and a longitudinal hook element 42 formed on one edge thereof, as shown in Fig. 8. The hook element 42 includes a hook recess 42a and a flange or tongue 42b adjacent thereto. When the locking strip 28 is inserted between the overlapping portions 35a and 36a to complete the joint 27, one edge of this strip engages in the recess of the hook element 41 and the hook element 42 of the strip engages the hook element 40 of the wall portion 35, as shown in Fig. 5 of the drawing.

Fig. 4 shows the joint 27 embodied in the wall of a metal container 43. The side walls of the container 43 are formed by bending a single piece of sheet metal to tubular form and shaping the adjacent ends 44 and 45 thereof to constitute portions of the joint 27. The bottom 46 of the container may be a separate sheet or panel which is soldered, welded or otherwise attached to the side wall structure after the joint 27 has been formed.

Figures 9, 10, 11, 12:
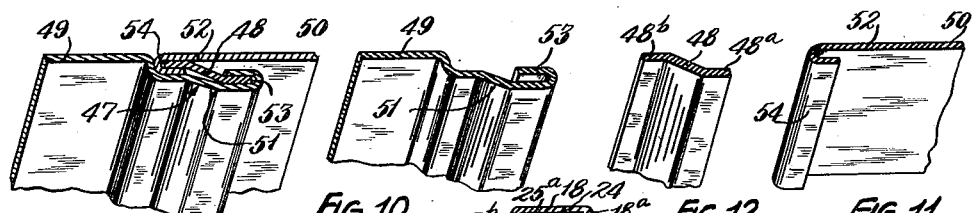
Fig. 9 is a perspective sectional view taken through a modified form of the improved joint.
Figs. 10 and 11 are perspective sectional views showing the connected members of Fig. 9 in spread-apart relation.
Fig. 12 is a perspective sectional view showing the locking strip of Fig. 9 in detached relation.

Fig. 9 shows a joint 47 which is similar to the joints above described, but is of a somewhat simpler construction in regard to the locking strip 48 used therein. In the joint 47 the sheets or wall members 49 and 50 correspond with the sheets 14 and 15 of Fig. 1 and have overlapping edge portions 51 and 52 which carry hook elements 53 and 54 and are of substantially the same construction as the overlapping edge portions 16 and 17 above described. The locking strip 48 is an elongated sheet metal strip of a substantially Z-shaped cross-section. The ends of the Z shape provide the longitudinal flanges or tongues 48a and 48b extending along opposite edges of the strip and the intermediate portion of the strip corresponds with the inclined connecting web of the Z shape. When the locking strip 48 is inserted between the overlapping edge portions 51 and 52 to complete the joint 47, the longitudinal tongues or flanges 48a and 48b engage in the recesses of the hook elements 53 and 54 and exert the above explained spreading action thereon to draw the sheets 49 and 50 together into relatively tight-fitting relation.

From the foregoing description and the accompanying drawings, it will now be readily understood that this invention provides an improved joint which can be economically constructed and assembled and which can be used to advantage in connecting sheets, panels and wall members without need for welding or mechanical fastening members and which produces a tightly joined wall construction having a desired flush or smooth exterior surface. It will also be seen that the improved joint, while suitable for a great variety of connecting purposes, is especially useful as a means for connecting wall panels used in building construction, and in connecting adjacent wall portions in fabricating metal cabinets, containers, and the like.

Although the improved joint construction of the present invention has been illustrated and described herein in considerable detail, it will be understood, of course, that the invention is not to be regarded as being limited correspondingly in scope since it includes all changes and modifications coming within the terms of the claim hereof.

Having thus described my invention, I claim:

In a joint of the character described, a pair of sheet metal sheets lying substantially in a common plane and having single thickness longitudinally continuous edge portions carrying longitudinally continuous hook elements, the hook-carrying edge portion of one sheet being offset from said common plane so as to form a longitudinally continuous shoulder spaced from the hook element of said one sheet and the hook-carrying edge portion of the other sheet overlapping the offset portion and having the exterior of its hook element in longitudinally continuous substantially abutting engagement with said shoulder, the hook element of said other sheet lying substantially in said common plane and the hook element of said one sheet being offset from said common plane, the hook elements of the overlapping edge portions being spaced apart and having longitudinally continuous hook recesses opening toward each other between the overlapping edge portions, and a sheet metal locking strip of substantially Z-shaped cross-section disposed between said overlapping edge portions and having its opposite longitudinal edge portions engaged in said hook recesses, said locking strip being insertable endwise between the overlapped portions and being of a width such that its opposite edge portions exert a spreading action against said hook elements for holding said shoulder of said one sheet and the exterior of the hook element of the other sheet in said abutting engagement.

LEE B. GREEN.

REFERENCES CITED

The following references are of record in the file of this patent:

UNITED STATES PATENTS

| Number | Name | Date |
|---|---|---|
| 2,213,519 | Faber | Sept. 3, 1940 |
| 2,258,911 | Skoko | Oct. 14, 1941 |
| 2,377,702 | Lindsay | June 5, 1945 |
| 2,381,030 | Blackburn | Aug. 7, 1945 |
| 2,393,770 | Harvey | Jan. 29, 1946 |
| 2,397,259 | Halicki et al. | Mar. 26, 1946 |
| 2,449,292 | Gillett et al. | Sept. 14, 1948 |

FOREIGN PATENTS

| Number | Country | Date |
|---|---|---|
| 292,077 | Germany | May 24, 1916 |